United States Patent
Subramanian Jayaraman et al.

(10) Patent No.: US 10,514,999 B2
(45) Date of Patent: Dec. 24, 2019

(54) METHOD AND A SYSTEM TO DETERMINE AN EFFECTIVENESS INDEX OF A SOFTWARE TEST ENVIRONMENT

(71) Applicant: WIPRO LIMITED, Bangalore (IN)

(72) Inventors: Venkata Subramanian Jayaraman, Chennai (IN); Sumithra Sunderasan, Chennai (IN)

(73) Assignee: Wipro Limited, Bangalore (IN)

(*) Notice: Subject to any disclaimer, the term of this patent is extended or adjusted under 35 U.S.C. 154(b) by 191 days.

(21) Appl. No.: 15/603,609

(22) Filed: May 24, 2017

(65) Prior Publication Data

US 2018/0285244 A1  Oct. 4, 2018

(30) Foreign Application Priority Data

Mar. 30, 2017 (IN) .............................. 201741011326

(51) Int. Cl.
G06F 11/36 (2006.01)

(52) U.S. Cl.
CPC ...... *G06F 11/3664* (2013.01); *G06F 11/3688* (2013.01); *G06F 11/3692* (2013.01); *G06F 11/3668* (2013.01)

(58) Field of Classification Search
CPC ............. G06F 11/3664; G06F 11/3688; G06F 11/3692; G06F 11/3668
See application file for complete search history.

(56) References Cited

U.S. PATENT DOCUMENTS

| | | | | |
|---|---|---|---|---|
| 9,495,642 B1* | 11/2016 | Smith | .................... | G06F 16/248 |
| 2006/0248504 A1* | 11/2006 | Hughes | ..................... | G06F 8/65 717/101 |
| 2015/0058680 A1* | 2/2015 | Kortti | ................... | G06F 11/368 714/47.2 |
| 2015/0206118 A1* | 7/2015 | Cummins | ............ | G06Q 20/203 705/21 |
| 2015/0309918 A1* | 10/2015 | Raghavan | ........... | G06F 11/3688 714/38.1 |
| 2015/0324274 A1* | 11/2015 | Raghavan | ........... | G06F 11/3684 717/124 |
| 2017/0093684 A1* | 3/2017 | Jayaraman | ................ | G06F 8/71 |
| 2017/0192875 A1* | 7/2017 | Shani | .................. | G06F 11/3608 |
| 2017/0293548 A1* | 10/2017 | Kolagatla | ........... | G06F 11/3672 |
| 2018/0067839 A1* | 3/2018 | Conti | .................. | G06F 11/3664 |
| 2018/0067844 A1* | 3/2018 | Conti | .................. | G06F 11/3688 |
| 2018/0068250 A1* | 3/2018 | Conti | .............. | G06Q 10/06393 |

* cited by examiner

*Primary Examiner* — Joseph O Schell (74) *Attorney, Agent, or Firm* — Finnegan, Henderson, Farabow, Garrett & Dunner, LLP (57) ABSTRACT

A method and a system are described for determining an effectiveness index of a software test environment. The method includes receiving a plurality of factors associated with a plurality of software modules of a plurality of software under test from a plurality of external systems. The method includes identifying the software test environment based on one or more values associated with each of the plurality of factors. The method includes collecting failure logs of each of the plurality of factors for the identified software test environment. The method includes assigning a score to each of the plurality of factors based on collected failure logs. The method includes determining an effectiveness index of the identified software test environment for each of the plurality of software modules based on the score.

17 Claims, 4 Drawing Sheets

FIG. 4 Example Computer System

METHOD AND A SYSTEM TO DETERMINE AN EFFECTIVENESS INDEX OF A SOFTWARE TEST ENVIRONMENT

TECHNICAL FIELD

The present subject matter is related, in general to software testing and more specifically, but not exclusively to a method and a system to determine an effectiveness index of a software test environment.

BACKGROUND

Software product testing is a cardinal step in software product making, before release of products in a market. A faster deployment to market or more specifically to clients, for a positive customer experience requires testing of software applications to be done efficiently and swiftly. Hypothetically, there is a need to have sophisticated test environment which would be an exact replica of a production. This may be beneficial for all business customers, as it might help them to visualize their upcoming products and enable them to take decisions. However, such replica of a production or product would be a very costly and hence will not be economical. However, existing test environments fail to determine the readiness, availability and stability of a test environment. The availability of right test environment is very important for the customers but existing systems fail to address this challenge.

The commonly faced challenges regarding test environment are remote test environment, sharing of test environment, test environment integration, complex test environment needs and time taken to prepare a test environment. Existing test environments fail to identify an optimum test environment that can be remotely available, shareable and easy to integrate.

The limitations and disadvantages of conventional and traditional approaches may become apparent to one skilled in the art, through comparison of systems described with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for determining an effectiveness index of a software test environment. The method may include receiving a plurality of factors associated with a plurality of software modules of a plurality of software under test from a plurality of external systems. The method may include identifying the software test environment based on one or more values associated with each of the plurality of factors. The method may include collecting failure logs of each of the plurality of factors for the identified software test environment. The method may include assigning a score to each of the plurality of factors based on collected failure logs. The method may include determining an effectiveness index of the identified software test environment for each of the plurality of software modules based on the score.

According to embodiments illustrated herein, there may be provided a software testing system to determine an effectiveness index of a software test environment, comprising a processor and a memory communicatively coupled to the processor, wherein the memory stores processor instructions, which, on execution, causes the processor to receive a plurality of factors associated with a plurality of software modules from a plurality of external systems. The processor may be further configured to identify the software test environment based on one or more values associated with each of the plurality of factors. The processor may be further configured to collect failure logs of each of the plurality of factors for the identified software test environment. The processor may be further configured to assign a score to each of the plurality of factors based on collected failure logs. The processor may be further configured to determine an effectiveness index of the identified software test environment for each of the plurality of software modules based on the score.

According to embodiments illustrated herein, a non-transitory computer-readable storage medium having stored thereon, a set of computer-executable instructions for causing a computer comprising one or more processors to perform steps comprising, receiving a plurality of factors associated with a plurality of software modules of a plurality of software under test from a plurality of external systems. The one or more processors may be configured to identify the software test environment based on one or more values associated with each of the plurality of factors. The one or more processors may be configured to collect failure logs of each of the plurality of factors for the identified software test environment. The one or more processors may be configured to assign a score to each of the plurality of factors based on collected failure logs. The one or more processors may be configured to determine an effectiveness index of the identified software test environment for each of the plurality of software modules based on the score.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
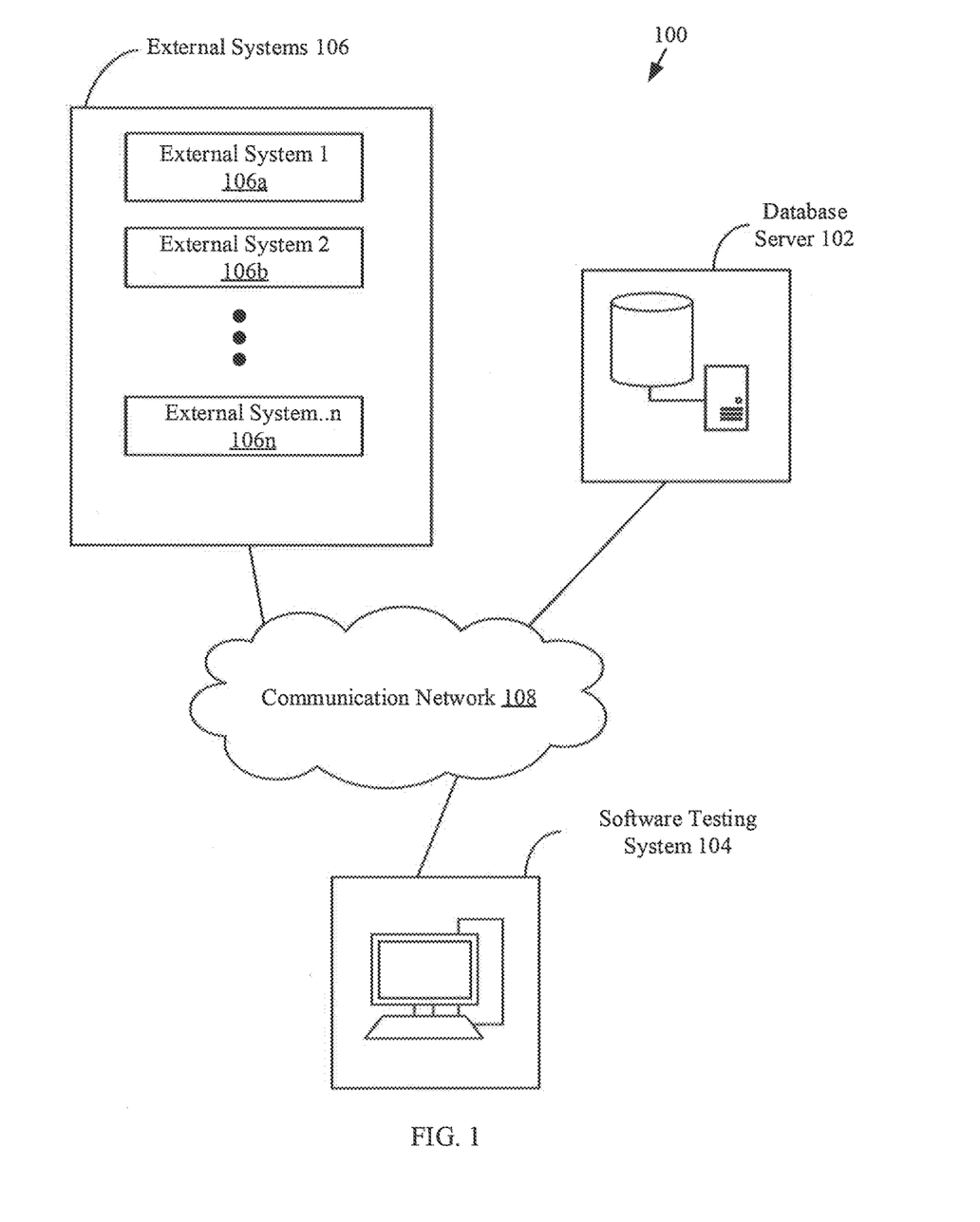
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a database server 102, a software testing system 104, a plurality of external systems 106, and a communication network 108. The software testing system 104 may be communicatively coupled to the database server 102 and the plurality of external systems 106 (such as, external system1 106a, external system1 106b, . . . , external system1 106n) via the communication network 108. In an embodiment, the software testing system 104 may communicate with the database server 102 using one or more protocols such as, but not limited to, Open Database Connectivity (ODBC) protocol and Java Database Connectivity (JDBC) protocol.

In an embodiment, the database server 102 may refer to a computing device that may be configured receive information from plurality of external systems 106, which may include point of sale device, credit card external systems, printers, scanners, and handheld devices. In an embodiment, the database server 102 may include a special purpose operating system specifically configured to perform one or more predetermined database operations. Examples of database operations may include, but are not limited to, Select, Insert, Update, and Delete. In an embodiment, the database server 102 may include hardware and/or software that may be configured to perform one or more predetermined operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to receive a request from the external system 106 to obtain information from the plurality of external systems which may comprise point of sale terminal device, credit card external systems, printers, scanners, and handheld devices. The database server 102 may be further configured to update information from all external interfaces such as 3rd party application connections, point of sale terminal device, credit card and external system connections may be handled and may help in identifying the external interface needs of the software testing system 104. A person with ordinary skills in the art will understand that the scope of the disclosure is not limited to the database server 102 as a separate entity. In an embodiment, the functionalities of the database server 102 can be integrated into the software testing system 104, and vice versa.

In an embodiment, the software testing system 104 may refer to a computing device or a software framework hosting an application or a software service. In an embodiment, the software testing system 104 may be implemented to execute procedures such as, but not limited to, programs, routines, or scripts stored in one or more memories for supporting the hosted application or the software service. In an embodiment, the hosted application or the software service may be configured to perform one or more predetermined operations. The software testing system 104 may be realized through various types of servers such as, but are not limited to, a Java application server, a .NET framework application server, a Base4 application server, a PHP framework application server, or any other application server framework.

In an embodiment, the software testing system 104 may be configured to determine an effectiveness index of a software test environment. In an embodiment, the software testing system 104 may be configured to receive a plurality of factors associated with a plurality of software modules from a plurality of external systems 106. In an embodiment, the software testing system 104 may be configured to identify the software test environment based on one or more values associated with each of the plurality of factors. In an embodiment, the software testing system 104 may be configured collect failure logs of each of the plurality of factors for the identified software test environment. In an embodiment, the software testing system 104 may be configured to assign a score to each of the plurality of factors based on collected failure logs. In an embodiment, the software testing system 104 may be configured to determine an effectiveness index of the identified software test environment for each of the plurality of software modules based on the score.

In an embodiment, the plurality of external systems 106 may refer to computing devices used by a user. The plurality of external systems 106 may include one or more processors and one or more memories. The one or more memories may include computer readable code that may be executable by the one or more processors to perform predetermined operations. The plurality of external systems 106 may interact with the software testing system 104 via the communication network 108 to feed information, which may be a plurality of factors related to a plurality of software modules. Examples of the plurality of external systems 106 may include, but not restricted to one or more point of sale terminal device, credit card external system, printer and scanner.

In an embodiment, the communication network 108 may correspond to a communication medium through which the database server 102, the software testing system 104, and the external system 106 may communicate with each other. Such a communication may be performed, in accordance with various wired and wireless communication protocols.

Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

Figure 2:
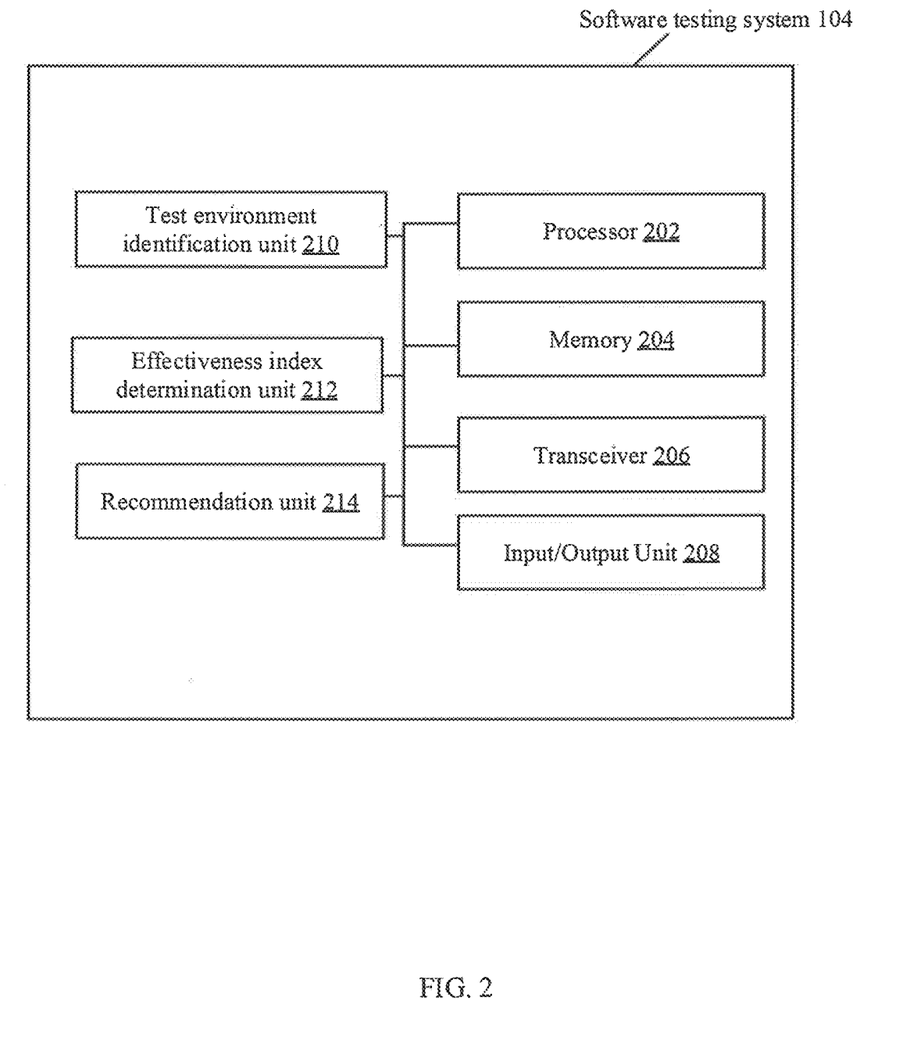
FIG. 2 is a block diagram that illustrates a software testing system configured to determining an effectiveness index of a software test environment, in accordance with some embodiments of the present disclosure.

FIG. 2 is a block diagram that illustrates the software testing system 104 configured to determine an effectiveness index of the software test environment, in accordance with some embodiments of the present disclosure. The software testing system 104 may include a processor 202, a memory 204, a transceiver 206, and an input/output unit 208. The software testing system 104 may further include a test environment identification unit 210, an effectiveness index determination unit 212 and a recommendation unit 214. The processor 202 may be communicatively coupled to the memory 204, the transceiver 206, and the input/output unit 208, the test environment identification unit 210, the effectiveness index determination unit 212 and the recommendation unit 214.

The processor 202 may include suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 may include suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 may include of suitable logic, circuitry, interfaces, and/or code that may be configured to transmit a request to the database server 102 to provide the plurality of factors and information on the plurality of external systems, which may comprise point of sale terminal device, credit card external systems, printers, scanners and hand held devices. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)

The Input/Output (I/O) unit 208 may include suitable logic, circuitry, interfaces, and/or code that may be configured to receive an input or transmit an output. The input/output unit 208 may include various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

The test environment identification unit 210 may include suitable logic, circuitry, interfaces, and/or code that may be configured to receive the plurality of factors associated with the plurality of software modules from the plurality of external systems 106. The test environment identification unit 210 may be further configured to identify the software test environment based on one or more values associated with each of the plurality of factors. In an embodiment, the plurality of factors associated with the software modules may comprise previous software modules deployment results, flags, table structure, complexity, external connectivity, critical functionality, and base functionalities. In an embodiment, the test environment identification unit 210 may be configured to identify the plurality of external systems comprises point of sale terminal device, credit card external systems, printers, scanners, and handheld devices.

The effectiveness index determination unit 212 may include suitable logic, circuitry, interfaces, and/or code that may be configured to collect failure logs of each of the plurality of factors for the identified software test environment. In an embodiment, the effectiveness index determination unit 212 may be further configured to collate the plurality of factors into a data structure. In an embodiment, the plurality of factors may correspond to software modules relation information. In a further embodiment, the plurality of factors may affect stability of the software test environment. In an embodiment, the effectiveness index determination unit 212 may be configured to classify the plurality of software modules into a plurality of software under test, based on input received from the user. In an embodiment, each of the plurality of software modules may be associated with a unique software under test from the plurality of software under test.

The effectiveness index determination unit 212 may be further configured to create a repository of the plurality of software modules. In an embodiment, the repository may comprise software module information of each of the plurality of software modules. The effectiveness index determination unit 212 may be configured to aggregate the one or more values associated with each of the plurality of factors to compute a software under test stability score for each of the plurality of software modules. In an embodiment, the software under test stability score may be indicative of stability of the identified test environment for each of the plurality of software modules. The effectiveness index determination unit 212 may be configured to compute a software under test stability score based on the software module stability score of each of the plurality of software modules.

The recommendation unit 214 may be configured to assign a score to each of the plurality of factors based on a collection of failure logs. The recommendation unit 214 may be further configured to determine an effectiveness index of the identified software test environment for each of the plurality of software modules based on the score. In an embodiment, the recommendation unit 214 may be further configured to update the one or more values associated with each of the plurality of factors to ensure continuous availability of the identified test environment. In an embodiment, the recommendation unit 214 may be further configured to determine a degree of planning of each of the plurality of software under test, based on input received from a user, and software module stability score for each of the plurality of software modules associated with the plurality of software under test.

The recommendation unit 214 may be configured to provide one or more recommendations to optimize the degree of planning of each of the plurality of software under test based on the software module stability score for each of the plurality of software modules associated with the plurality of software under test. In an embodiment, the one or more recommendations may comprise at least one of reduction in resources within the software under test, increase of resources within the software under test, or sharing of resources within the plurality of software under test.

In operation, the test environment identification unit 210 may be configured to identify the plurality of external systems 106 including point of sale terminal device, credit card external systems, printers, scanners, and handheld devices. In an embodiment, the software testing system 104 may be configured to receive a plurality of factors associated with a plurality of software modules from a plurality of external systems 106. The plurality of factors may relate to test environment, previous deployment success data, flags, table structure, complexity, external connectivity, critical functionality and base functionalities, all of which are sent by the external system 106. In an embodiment, the plurality of factors is collated into the data structure. In a further embodiment, the plurality of factors may affect the stability of the software test environment. In an exemplary embodiment, the data structure may correspond to a table, where the plurality of factors may be structured as per their relation with the software modules. For example, Table 1 may explain the data structure.

the software modules related information of the software modules. The external system 106 may transmit the plurality of factors, whenever a request is made by the software testing system 104 for determining an effectiveness index of a software test environment.

After receiving the plurality of factors, the test environment identification unit 210 may may be configured to identify the software test environment based on one or more values associated with each of the plurality of factors. In an embodiment, the plurality of factors associated with the software modules may comprise previous software modules deployment results, flags, table structure, complexity, external connectivity, critical functionality, and base functionalities.

The effectiveness index determination unit 212 may be configured to receive the plurality of factors from the test environment identification unit 210. In an embodiment, the effectiveness index determination unit 212 may be further configured to collate the plurality of factors into a data structure. In an embodiment, the plurality of factors may correspond to software modules relation information. In a further embodiment, the plurality of factors may affect stability of the software test environment. In an embodiment, the effectiveness index determination unit 212 may be configured to classify the plurality of software modules into a plurality of software under test based on input received from a user. In an embodiment, each of the plurality of software modules may be associated with a unique software under test from the plurality of software under test. The effectiveness index determination unit 212 may be further configured to create a repository of the plurality of software modules. In an embodiment, the repository may comprise software module information of each of the plurality of software modules. The effectiveness index determination unit 212 may be configured to aggregate the one or more values associated with each of the plurality of factors to compute a software module stability score for each of the plurality of software modules. In an embodiment, the software under test stability score may be indicative of stability of the identified test environment for each of the plurality of software modules. The effectiveness index determination unit 212 may be configured to compute the software under test stability score based on a stability score of each of the plurality of software modules.

The effectiveness index determination unit 212 may check an information on the data structure created by the test

TABLE 1

| | | Functionality Collector | | | | | |
|---|---|---|---|---|---|---|---|
| Project | # of base functionalities | new functionalities added | Peripherals available | Peripherals connected | Peripherals new | External system interfaces | Total external connectivity |
| Software module 1 | 10 | 5 | 4 | 4 | 0 | 0 | 10 |
| Software module 2 | 12 | 4 | 8 | 6 | 7 | 9 | 5 |
| Software module 3 | 2 | 0 | 8 | 6 | 8 | 7 | 6 |

In an exemplary embodiment, the software modules may be software module 1, software module 2 and software module 3. The plurality of factors may be number of base functionalities, new functionalities added, peripherals available, peripherals connected, peripherals new, external system interfaces and total external connectivity. The numbers in Table 1 corresponds to a quantitative measure of the plurality of factors. The data in Table 1 is a consolidation of environment identification unit 210, and may use it to determine the effectiveness of the software test environment. The effectiveness index determination unit 212 may be configured to check the status of the current software test environment, by analyzing the plurality of input factors. For example. Table 2 denotes the status of the software modules in an already existing software test environment.

TABLE 2

|  | Is the environment setup | Is the deployment a success | Setup/flags | Metadata/Table | Is base functionality run | is critical functionality run a success | Is external connectivity a success |
|---|---|---|---|---|---|---|---|
| Software module 1 | Yes | Yes | Yes | Yes | Yes | Yes | Yes |
| Software module 2 | No | Yes | No | Yes | No | Yes | No |
| Software module 3 | No | Yes | Yes | No | Yes | No | Yes |

In an exemplary embodiment, Table 2 shows the current status of the various software modules, with regards to the plurality of factors in operation. The effectiveness index determination unit 212 checks whether the environment has been setup, was the deployment a success, setup/flags, metadata/table, whether base functionality been run, whether critical functionality has a successful run and whether external connectivity was successful. Yes, or No in Table 2 denotes the status for the plurality of factors. For example, effectiveness index determination unit 212 checks if a deployment of a software module is done. If the deployment is success, the Yes is denoted on a display of the software testing system 104. The flags are then checked and if the flags are also Yes, then the availability of plurality of factors are checked. The effectiveness index determination unit 212 may then check for the current status of a functionality of the plurality of factors in the software test environment.

The effectiveness index determination unit 212 may be further configured to collect failure logs of each of the plurality of factors for the identified software test environment. The failure log may be enabled for each and every failure, and may collect the actions which may be taken and what further information may be required. For every failure, a score may be assigned. For example, Table 3 may provide an example of a failure log status.

TABLE 3

| Software test Environment analysis | IS environment setup | High |
| | Is the deployment a success | Low |
| | Setup/flags | Med |
| | Metadata/Table | High |
| Factors Functionality checker | Is base functionality run | Med |
| | is critical functionality run a success | High |
| | Is external connectivity a success | High |

In the above table, High signifies twice the weightage, Medium signifies 1.5 times the weightage and Low signifies one-time weightage.

The recommendation unit 214 may be configured to assign a score to each of the plurality of factors based on collected failure logs. The recommendation unit 214 may be further configured to determine an effectiveness index of the identified software test environment for each of the plurality of software modules based on the score. In an embodiment, the recommendation unit 214 may be further configured to update the one or more values associated with each of the plurality of factors to ensure continuous availability of the identified test environment. In an embodiment, the recommendation unit 214 may be further configured to determine a degree of planning of each of the plurality of software under test based on input received from a user, and software module stability score for each of the plurality of software modules associated with the plurality of software under test.

The recommendation unit 214 may be configured to provide one or more recommendations to optimize the degree of planning of each of the plurality of software under test based on the software module stability score for each of the plurality of software modules associated with the plurality of software under test. In an embodiment, the one or more recommendations may comprise at least one of reduction in resources within the software under test, increase of resources within the software under test, or sharing of resources within the plurality of software under test.

After the failure log may be determined by the effectiveness index determination unit 212, the recommendation unit 214 may assign the failure logs into numerical units. In an embodiment, the recommendation unit 214 may provide an understanding of what values each of the plurality of factors in the data structure may signify. For example, Table 4 may denote values for plurality of factors for their effectiveness in the software test environment.

TABLE 4

| Software test Environment analysis | IS environment setup | 40% |
| | Is the deployment a success | 20% |
| | Setup/flags | 20% |
| | Metadata/Table | 20% |
| Factors Functionality checker | Is base functionality run | 30% |
| | is critical functionality run a success | 40% |
| | Is external connectivity a success | 40% |

In an embodiment, the recommendation unit 214 may be further configured to update the one or more values associated with each of the plurality of factors to ensure continuous availability of the identified software test environment. In an embodiment, the recommendation unit 214 may be further configured to determine a degree of planning of each of the plurality of the software under test based on inputs received by a business user and an analysis of the plurality of software under test. In an embodiment, the recommendation unit 214 may be configured to provide one or more recommendations to optimize the degree of planning of each of the plurality of software under test based on the software module stability score for each of the plurality of software modules associated with the plurality of software under test. In an embodiment, the one or more recommendations may comprise at least one of reduction in resources within the software under test, increase of resources within the software under test, or sharing of resources within the plurality of software under test. analysis of plurality of the software under test may require a priority for the software test environment.

In an exemplary embodiment, the recommendation unit 214 may update the one or more values associated with each of the plurality of factors to ensure continuous availability of the identified test environment. A significance of the weightage of the flags may be measured based on the percentage of weightage of the plurality of factors, as shown in Table 4. In an embodiment, based on the weightages, high or low or medium, the software modules are denoted numerical flags, as shown in Table 5.

TABLE 5

| | IS environment setup | Is the deployment a success | Setup/ flags | Metadata/ Table | Is base functionality run | is critical functionality run a success | Is external connectivity a success |
|---|---|---|---|---|---|---|---|
| Software module 1 | 2 | 1 | 1.5 | 2 | 1.5 | 2 | 2 |
| Software module 2 | 0 | 1 | 0 | 2 | 0 | 2 | 0 |
| Software module 3 | 0 | 1 | 1.5 | 0 | 1.5 | 0 | 2 |

In an embodiment, if a total calculated value of the plurality of factors may be greater than 10, then the overall effectiveness of the software module may be denoted as high and may considered for determining a degree of planning. In an exemplary embodiment, weightage of software module 1 is 12, weightage of software module 2 is 5 and weightage of software module 3 is 6. Software module 1 is hence considered for self-heal. The software modules which may not be chosen for further degree of planning, the recommendation unit 214 shall recommend for further analysis of the requirements for the software modules and how No flags may be converted into Yes flags. For example, software module 2 and software module 3 where the flag is No, the recommendation unit 214 may trigger the software test environment for further acquiring relevant plurality of factors, suitable for the software test environment. For example, Table 6 may illustrate the inputs as provided by the user. In an embodiment, the user may be a customer.

TABLE 6

| Software under test | Software modules | Tool Weightage | User Weightage |
|---|---|---|---|
| Software under test 1 | Software module 1 | 12 | HIGH |
| Software under test 2 | Software module 2 | 5 | LOW |
| Software under test 3 | Software module 3 | 6 | HIGH |
| Software under test 1 | Software module 4 | 10 | HIGH |
| Software under test 2 | Software module 5 | 14 | HIGH |
| Software under test 3 | Software module 6 | 3 | HIGH |
| Software under test 1 | Software module 7 | 4 | LOW |
| Software under test 2 | Software module 8 | 6 | MED |
| Software under test 3 | Software module 9 | 7 | LOW |
| Software under test 1 | Software module 10 | 8 | HIGH |
| Software under test 2 | Software module 11 | 9 | MED |
| Software under test 3 | Software module 12 | 12 | LOW |
| Software under test 1 | Software module 13 | 14 | LOW |
| Software under test 2 | Software module 14 | 10 | MED |
| Software under test 3 | Software module 15 | 6 | HIGH |
| Software under test 1 | Software module 16 | 3 | HIGH |

The recommendation unit 214 may be further configured to update one or more values associated with each of the plurality of factors to ensure continuous availability of the identified test environment. For example, Table 7 may illustrate a combined effectiveness of the user and weightage of the plurality of factors. The recommendation unit 214 may be further configured to show the contents of Table 7 in a graphical format.

TABLE 7

| Software under test | Software modules | tool Weightage | User Weightage | Mean Tool Average | Mean User weightage |
|---|---|---|---|---|---|
| Software under test 1 | Software module 1 | 12 | 3 | 8 | 2.5 |
| | Software module 4 | 10 | 3 | 8 | 2.5 |
| | Software module 7 | 4 | 1 | 8 | 2.5 |
| | Software module 10 | 8 | 3 | 8 | 2.5 |
| | Software module 13 | 14 | 1 | 8 | 2.5 |
| | Software module 16 | 3 | 3 | 8 | 2.5 |
| Software under test 2 | Software module 2 | 5 | 1 | 8 | 2.5 |
| | Software module 5 | 14 | 3 | 8 | 2.5 |
| | Software module 8 | 6 | 2 | 8 | 2.5 |
| | Software module 11 | 9 | 2 | 8 | 2.5 |
| | Software module 14 | 10 | 2 | 8 | 2.5 |
| Software under test 3 | Software module 3 | 6 | 3 | 8 | 2.5 |
| | Software module 6 | 3 | 3 | 8 | 2.5 |
| | Software module 9 | 7 | 1 | 8 | 2.5 |
| | Software module 12 | 12 | 1 | 8 | 2.5 |
| | Software module 15 | 6 | 3 | 8 | 2.5 |

The recommendation unit 214 may be further configured to provide one or more recommendations to optimize the degree of planning of each of the plurality of software under test based on the software module stability score for each of the plurality of software modules associated with the plurality of software under test. In an embodiment, the one or more recommendations may comprise at least one of reduction in resources within the software under test, increase of resources within the software under test, or sharing of resources within the plurality of software under test. For example, if a soft under test, if a number of software modules have a high need for test environment and this has not been successfully met, then the recommendation unit 214 may provide a recommendation for a certain set of software under test.

In an embodiment, software under test 1 has three software modules that has a high need for the test environment, but simultaneously all the three software modules have the required test environment. In this case no action is required. In another exemplary embodiment, software module 2 has three software modules, but only one software module has plurality of factors for a test environment, then the recommendation unit 214 may suggest better planning and resource utilization for the other two software modules.

Table 8 illustrates an example of the degree of planning and the recommendations as flagged by the recommendation unit 214.

TABLE 8

| Software under test | Planning Determination output | Recommendation |
|---|---|---|
| Software under test 1 | Well planned | No action needed |
| Software under test 2 | Over planned | Resource reduction/sharing recommended |
| Software under test 3 | Poor Planning | Procure more resource/take from shared pool |

Figure 3:
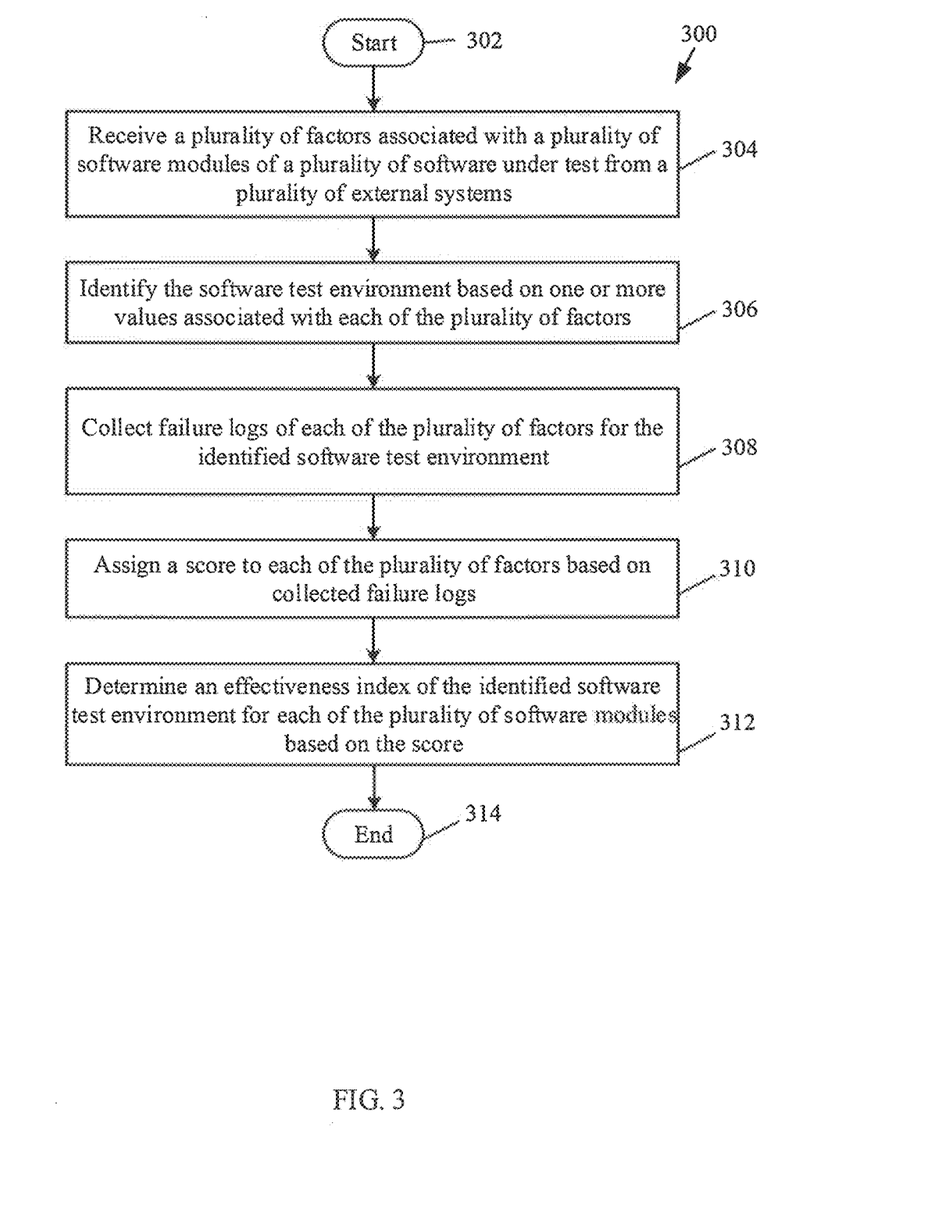
FIG. 3 is a flowchart illustrating a method for determining an effectiveness index of a software test environment, in accordance with some embodiments of the present disclosure.

FIG. 3 is a flowchart illustrating a method 300 for determining an effectiveness index of a software test environment, in accordance with some embodiments of the present disclosure. The method starts at step 302 and proceeds to step 304. At step 304, the software testing system 104 may receive a plurality of factors associated with a plurality of software modules of a software under test from a plurality of external systems. At step 306, the software testing system 104 may be configured to identify the software test environment based on one or more values associated with each of the plurality of factors. At step 308, the software testing system 104 may be configured to collect failure logs of each of the plurality of factors for the identified software test environment. At step 310, software testing system 104 may be configured to assign a score to each of the plurality of factors based on collected failure logs. At step 312, the software testing system 104 may be configured to determine an effectiveness index of the identified software test environment for each of the plurality of software modules based on the score. Control passes to end step 314.

Computer System

Figure 4:
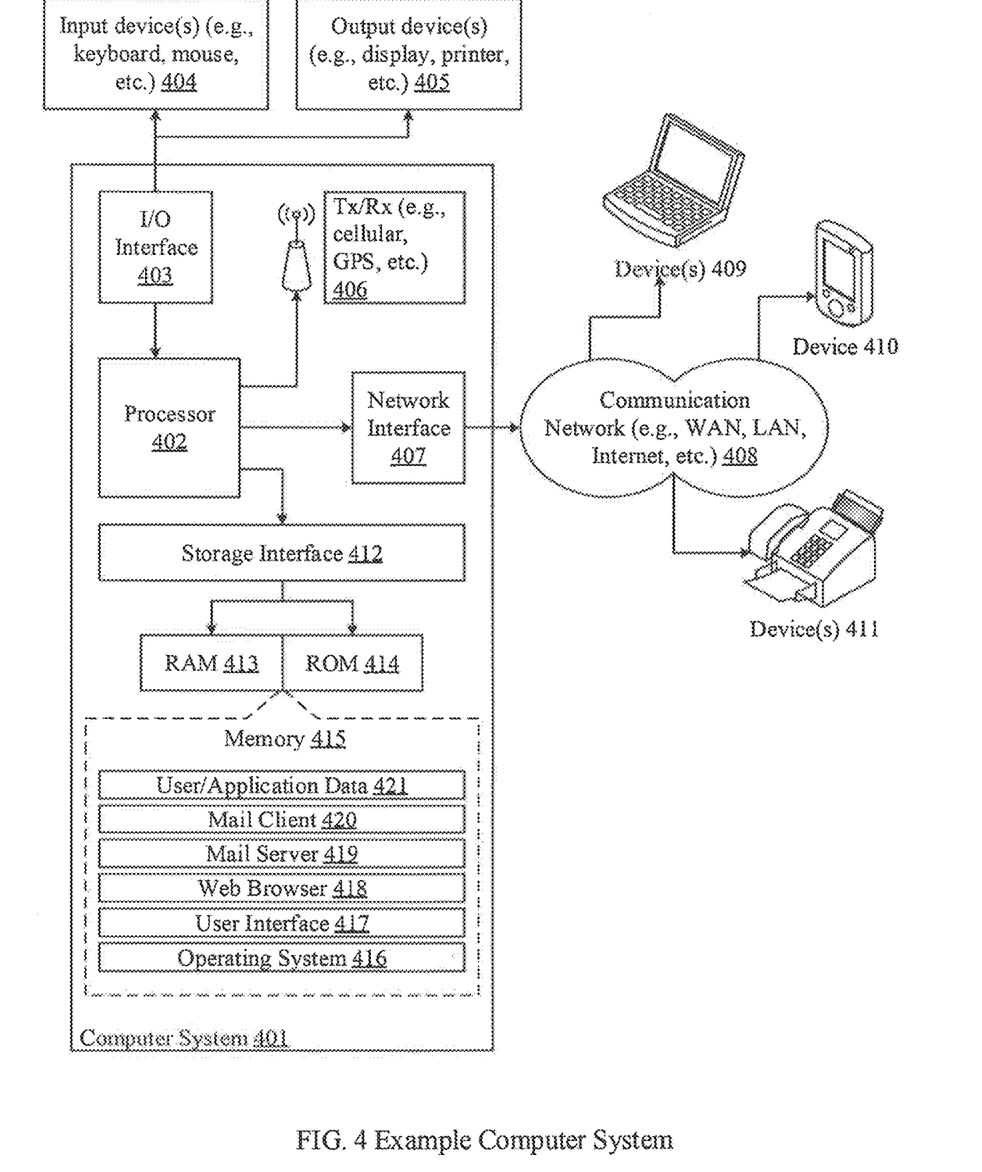
FIG. 4 illustrates a block diagram of an exemplary computer system for implementing embodiments consistent with the present disclosure.

FIG. 4 illustrates a block diagram of an exemplary computer system for implementing embodiments consistent with the present disclosure. Variations of computer system 401 may be used for determining an effectiveness index of a software test environment. The computer system 401 may comprise a central processing unit ("CPU" or "processor") 402. Processor 402 may comprise at least one data processor for executing program components for executing user or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Disclosed software testing system determine the readiness, availability and stability of a test environment. Further, the software testing system identifies an optimum test environment that can be remotely available, shareable and easy to integrate. Further, the recommendations provided by the software testing system are useful and at the same time there is no wastage of resources as the resources are sharable.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for determining an effectiveness index of a software test environment, the method comprising:
   receiving, by a software testing system, a plurality of factors associated with a plurality of software modules of a plurality of software under test from a plurality of external systems;
   identifying, by the software testing system, the software test environment based on one or more values associated with each of the plurality of factors;
   collecting, by the software testing system, failure logs of each of the plurality of factors for the identified software test environment;
   assigning, by the software testing system, a score to each of the plurality of factors based on collected failure logs;
   determining, by the software testing system, an effectiveness index of the identified software test environment for each of the plurality of software modules based on the score; and
   determining, by the software testing system, a degree of planning of each of the plurality of software under test based on input received from a user, and software module stability score for each of the plurality of software modules associated with the plurality of software under test, wherein the degree of planning of each of the plurality of software under test is further optimized by providing one or more recommendations based on the software module stability score, the one or more recommendations comprising at least one of reduction in resources within the plurality of software under test, increase of resources within the plurality of software under test, or sharing of resources within the plurality of software under test.

2. The method of claim 1, wherein the plurality of factors associated with the software modules comprises previous software modules deployment results, flags, table structure, complexity, external connectivity, critical functionality, and base functionalities.

3. The method of claim 1, further comprising collating the plurality of factors into a data structure, wherein the plurality of factors corresponds to software modules relation information, and wherein the plurality of factors affects stability of the software test environment.

4. The method of claim 1, further comprising classifying the plurality of software modules into the plurality of software under test based on input received from a user, wherein each of the plurality of software modules are associated with a unique software under test from the plurality of software under test.

5. The method of claim 1, further comprising creating a repository of the plurality of software modules, wherein the repository comprises software module information of each of the plurality of software modules.

6. The method of claim 1, further comprising aggregating the one or more values associated with each of the plurality of factors to compute a software module stability score for each of the plurality of software modules, wherein the software module stability score is indicative of stability of the identified test environment for each of the plurality of software modules.

7. The method of claim 6, further comprising computing a software under test stability score based on the software module stability score of each of the plurality of software modules.

8. The method of claim 1, wherein the plurality of external systems comprises point of sale terminal device, credit card external systems, printers, scanners, and handheld devices.

9. The method of claim 1, further comprising updating the one or more values associated with each of the plurality of factors to ensure continuous availability of the identified test environment.

10. A software testing system to determine an effectiveness index of a software test environment, comprising:
   a processor; and
   a memory communicatively coupled to the processor, wherein the memory stores processor instructions, which, on execution, causes the processor to:
      receive a plurality of factors associated with a plurality of software modules of a plurality of software under test from a plurality of external systems;
      identify the software test environment based on one or more values associated with each of the plurality of factors;
      collect failure logs of each of the plurality of factors for the identified software test environment;
      assign a score to each of the plurality of factors based on collected failure logs;
      determine an effectiveness index of the identified software test environment for each of the plurality of software modules based on the score; and
      determine a degree of planning of each of the plurality of software under test based on input received from a user, and software module stability score for each of the plurality of software modules associated with the plurality of software under test, wherein the degree of planning of each of the plurality of software under test is further optimized by providing one or more recommendations based on the software module stability score, the one or more recommendations comprising at least one of reduction in resources within the plurality of software under test, increase of resources within the plurality of software under test, or sharing of resources within the plurality of software under test.

11. The software testing system of claim 10, wherein the plurality of factors associated with the software module comprises previous software modules deployment results, flags, table structure, complexity, external connectivity, critical functionality, and base functionalities.

12. The software testing system of claim 10, wherein the processor is further configured to collate the plurality of factors into a data structure, wherein the plurality of factors corresponds to software modules relation information, and wherein the plurality of factors affects stability of the software test environment.

13. The software testing system of claim 10, wherein the processor is further configured to classify the plurality of software modules into a plurality of software under test based on input received from a user, wherein each of the plurality of software modules are associated with a unique software under test from the plurality of software under test.

14. The software testing system of claim 10, wherein the processor is further configured to comprise create a repository of the plurality of software modules, wherein the repository comprises software module information of each of the plurality of software modules.

15. The software testing system of claim 10, wherein the processor is further configured to aggregate the one or more values associated with each of the plurality of factors to compute a software module stability score for each of the plurality of, software modules wherein the software module stability score is indicative of stability of the identified test environment for each of the plurality of software modules.

16. The software testing system of claim 15, wherein the processor is further configured to compute a software under test stability score based on the software module stability score of each of the plurality of software modules.

17. A non-transitory computer-readable storage medium having stored thereon, a set of computer-executable instructions for causing a computer comprising one or more processors to perform steps comprising:
receiving a plurality of factors associated with a plurality of software modules of a plurality of software under test from a plurality of external systems;
identifying the software test environment based on one or more values associated with each of the plurality of factors;
collecting failure logs of each of the plurality of factors for the identified software test environment;
assigning a score to each of the plurality of factors based on collected failure logs;
determining an effectiveness index of the identified software test environment for each of the plurality of software modules based on the score; and
determining a degree of planning of each of the plurality of software under test based on input received from a user, and software module stability score for each of the plurality of software modules associated with the plurality of software under test, wherein the degree of planning of each of the plurality of software under test is further optimized by providing one or more recommendations based on the software module stability score, the one or more recommendations comprising at least one of reduction in resources within the plurality of software under test, increase of resources within the plurality of software under test, or sharing of resources within the plurality of software under test.

* * * * *